United States Patent [19]
Eilert et al.

[11] Patent Number: 5,925,102
[45] Date of Patent: Jul. 20, 1999

[54] MANAGING PROCESSOR RESOURCES IN A MULTISYSTEM ENVIRONMENT IN ORDER TO PROVIDE SMOOTH REAL-TIME DATA STREAMS, WHILE ENABLING OTHER TYPES OF APPLICATIONS TO BE PROCESSED CONCURRENTLY

[75] Inventors: Catherine Krueger Eilert; Peter Bergersen Yocom, both of Wappingers Falls, N.Y.

[73] Assignee: International Business Machines Corporation, Armonk, N.Y.

[21] Appl. No.: 08/827,529

[22] Filed: Mar. 28, 1997

[51] Int. Cl.$^6$ .................................................. G06F 13/00
[52] U.S. Cl. ..................... 709/226; 709/200; 709/223; 709/1; 709/3; 709/5
[58] Field of Search .................................. 395/670–674, 395/200.31, 200.53, 200.55, 200.56; 709/226, 200, 223, 1, 3, 5

[56] References Cited

U.S. PATENT DOCUMENTS

| | | | |
|---|---|---|---|
| 5,191,410 | 3/1993 | McCalley et al. | 358/86 |
| 5,204,947 | 4/1993 | Bernstein et al. | 395/157 |
| 5,210,872 | 5/1993 | Ferguson et al. | 395/672 |
| 5,333,266 | 7/1994 | Boaz et al. | 395/200 |
| 5,408,465 | 4/1995 | Gusella et al. | 370/17 |
| 5,461,611 | 10/1995 | Drake, Jr. et al. | 370/54 |
| 5,473,680 | 12/1995 | Porter | 379/201 |
| 5,473,773 | 12/1995 | Aman et al. | 395/650 |
| 5,487,167 | 1/1996 | Dinallo et al. | 395/650 |
| 5,491,694 | 2/1996 | Oliver et al. | 370/85.4 |
| 5,493,568 | 2/1996 | Sampat et al. | 370/60 |
| 5,497,373 | 3/1996 | Hulen et al. | 370/79 |
| 5,537,542 | 7/1996 | Eilert et al. | 395/200.31 |
| 5,675,739 | 10/1997 | Eilert et al. | 395/200.56 |

FOREIGN PATENT DOCUMENTS

| | | | |
|---|---|---|---|
| 07023104-A | 1/1995 | Japan | H04M 3/00 |
| 07307735-A | 11/1995 | Japan | H04L 12/28 |
| 08022435-A | 1/1996 | Japan | G06F 15/00 |

OTHER PUBLICATIONS

"Distributed Multimedia Services," IBM Technical Disclosure Bulletin, vol. 37, No. 08, pp. 63–64 (Aug. 1994).

"File Input/Output Control for Mixed Multimedia and Non–Multimedia Services," IBM Technical Bulletin, vol. 38, No. 11, p. 363 (Nov. 1995).

*Primary Examiner*—Meng-Ai T. An
*Assistant Examiner*—Nabil El-Hady
*Attorney, Agent, or Firm*—William A. Kinnaman, Esq.; Heslin & Rothenberg, P.C.

[57] ABSTRACT

A system within a multisystem environment is selected to run a real-time application. The selection process looks for a system in which the amount of a processor resource for delivering a real-time data stream of the real-time application has the least impact on other work proseccing on the selected system. The real-time application is allocated an amount of a processor resource that does not exceed a limit chosen for a group of one or more real-time applications. A selected amount of the processor resource remains available for at least one non-real-time application of the multisystem environment.

26 Claims, 12 Drawing Sheets

MANAGING PROCESSOR RESOURCES IN A MULTISYSTEM ENVIRONMENT IN ORDER TO PROVIDE SMOOTH REAL-TIME DATA STREAMS, WHILE ENABLING OTHER TYPES OF APPLICATIONS TO BE PROCESSED CONCURRENTLY

TECHNICAL FIELD

This invention relates, in general, to managing processor resources of a multisystem environment and, in particular, to selecting a system from the multisystem environment that can provide appropriate processor resources to present smooth, uninterrupted real-time data streams, while enabling other types of applications and work to concurrently execute on the same system.

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Managing Processor Resources In A Non-Dedicated Computer System," by Eilert et al., Ser. No. 08/829,538 filed Mar. 28, 1997;

"System Of Managing Processor Resources In A Non-Dedicated Computer System," by Eilert et al., Ser. No. 08/827,286 filed Mar. 28, 1997; and "System Of Managing Processor Resources In A Multisystem Environment," by Eilert et al., Ser. No. 08/826,028 filed Mar. 28, 1997.

BACKGROUND ART

Delivery of quality real-time data streams has been and continues to be an important concern in the computer environment. Real-time data streams include, for instance, video, audio and multimedia data streams, to name a few. Currently, two approaches are used to deliver real-time data streams: configuration control and high dispatch priority, each of which is described below.

In the configuration control approach, a server is dedicated to the delivery of real-time data streams. In particular, the server is configured with sufficient capacity to deliver real-time data streams at a given rate. Since the server is dedicated to the delivery of real-time data streams, the real-time streams monopolize the system resources leaving very little, if anything at all, for other types of work.

In the high dispatch priority approach, the real-time applications are run at a very high dispatch priority. This technique need not be run on a dedicated system; however, by running the real-time applications at a very high priority, again, there is no control or guarantee that other work in the system will receive sufficient resources to execute.

Thus, a need exists for a technique that delivers real-time data streams smoothly and uninterrupted, while providing a desired amount of the processor resource for other work to be concurrently executed on the system. A further need exists for a management technique that allows a limit to be placed on the amount of resource allocated to real-time data streams, such that a selected amount of the resource remains available for non-real-time work. A yet further need exists for a mechanism that can choose among a plurality of systems the system that best fits the needs of the real-time application and the other non-real-time work of the system.

SUMMARY OF THE INVENTION

The shortcomings of the prior art are overcome and additional advantages are provided through the provision of a method for managing processor resources in a multisystem environment comprising a plurality of systems. The method includes, for example, allocating an amount of a processor resource to a real-time application of the multisystem environment. The amount is not to exceed a limit chosen for a group of one or more real-time applications. Additionally, a selected amount of the processor resource remains available for at least one non-real-time application of the multisystem environment. The method also includes processing the real-time application on a selected system of the plurality of systems.

In one example, the method further includes selecting the system. The selecting includes choosing from among at least two systems of the plurality of systems a system where an amount of the processor resource for delivering a real-time data stream of the real-time application has a least impact on other work on the selected system.

In another example, the allocating further includes determining from among the at least two systems a highest service cost, within a given period of time, for delivering a real-time data rate; calculating a service rate for delivering the real-time data stream, in which the calculating uses the highest service cost; and determining whether the service rate falls within the limit. When the service rate falls within the limit, the selecting is performed.

In yet a further example, the method includes informing at least any non-selected system about the selected system.

In a further aspect of the present invention, an article of manufacture is provided, which includes a computer useable medium having computer readable program code means embodied therein for causing the managing of processor resources in a multisystem environment including a plurality of systems. In one example, the computer readable program code means in the article of manufacture includes computer readable program code means for causing a computer to effect allocating an amount of a processor resource to a real-time application of the multisystem environment. The amount is not to exceed a limit chosen for a group of one or more real-time applications, which includes at least the real-time application. A selected amount of the processor resource remains available for at least one non-real-time application of the multisystem environment. The article of manufacture further includes computer readable program code means for causing a computer to effect processing the real-time application on a selected system of the plurality of systems.

The management capability of the present invention advantageously provides for the selection of a system of a multisystem environment that can run real-time applications, while preventing the real-time applications from overrunning the entire system. The selection process takes into consideration displacing the lowest importance work of a system. Although some work may be displaced, the present invention still enables the selection of a particular amount of a processor resource to be utilized by real-time applications, while preserving a chosen amount of the resource for non-real-time applications. In accordance with the principles of the present invention, real-time applications can run smoothly and uninterrupted, while other types of work can also be processed on the system.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, real-time applications, as well as other types of applications, such as, batch and transaction processing applications, can concurrently execute within a general purpose multisystem environment (i.e., one or more non-dedicated computer systems). In particular, the real-time applications are provided with a limited amount of processor resources, such that the real-time applications do not overrun the system. The other types of applications (i.e., the non-real-time applications) are also provided a certain amount of processor resources for processing. As used herein, non-real-time applications include any applications not run in real-time, such as, for instance, batch applications and transaction processing applications, as well as any other work that runs on the system in non-real-time.

Further, in accordance with the principles of the present invention, a selection process is provided in which one system of the multisystem environment is selected to run the real-time application. The selection process takes into consideration displacing the lowest importance work within the multisystem environment.

Figure 1:
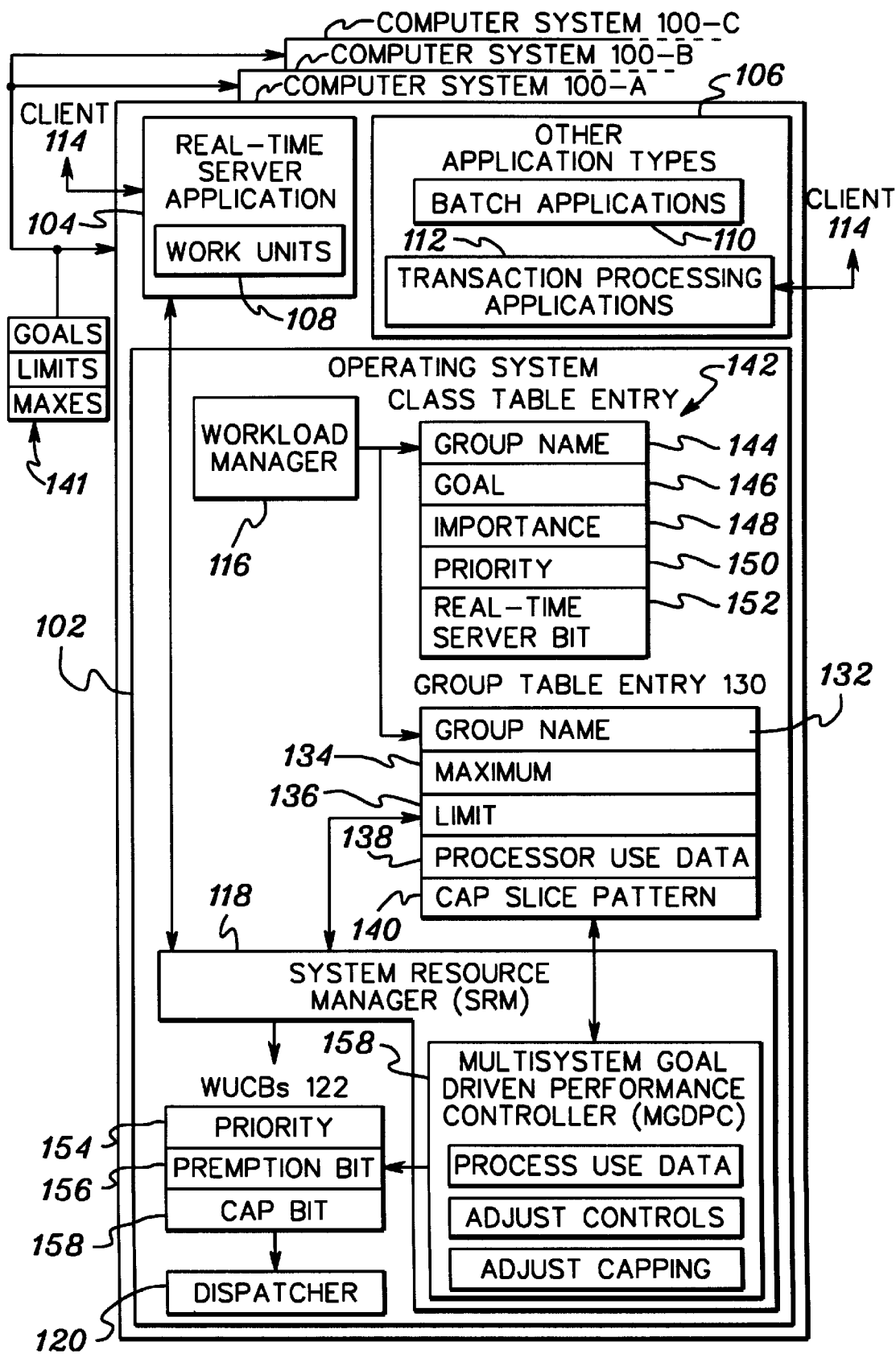
FIG. 1 depicts one example of a multisystem environment incorporating and using the management capabilities of the present invention.

One example of a multisystem environment incorporating and using the capabilities of the present invention is depicted in FIG. 1 and described in detail below.

In one embodiment, the multisystem environment includes a plurality of computer systems (e.g., computer systems 100-A, 100-B and 100-C). The systems are, for instance, interconnected, cooperating, independent computer systems. Those skilled in the art will recognize that any number of such interconnected, cooperating computer systems may be used without departing from the spirit of the present invention.

One such computer system (e.g., computer system 100-A) is described in detail below. However, it will be understood, that any of the computer systems of the multisystem environment can include one or more of the described components.

In one example, computer system 100-A (as one instance) includes an operating system 102, at least one real-time server application 104, and one or more other types of applications 106. Real-time server application 104 delivers real-time data and includes one or more work units 108. The work units are, for example, the application programs that do the useful work that is the purpose of the computer system. The other types of applications 106 include, for instance, batch applications 110 and transaction processing applications 112, which also include work units. The real-time server applications and the transaction processing applications are serving clients 114 at, for instance, workstations coupled to computer system 100-A.

Operating system 102 is, in one example, the Multiple Virtual Storage (MVS) operating system offered by International Business Machines Corporation. This is only one example, however. Other operating systems may be used without departing from the spirit or scope of the present invention. In one embodiment, operating system 102 includes a workload manager 116, a system resource manager 118, a dispatcher 120 and one or more work unit control blocks 122, each of which is described in further detail below.

Workload manager 116 manages the workload of computer system 100-A. One task of the workload manager includes reading in as input to the computer system certain values used by the management capability of the present invention. For example, the workload manager reads in one or more processor consumption limit values and one or more processor consumption maximum values, which are used to determine the amount of resources to be allocated to real-time applications (i.e., applications delivering real-time data) and non-real-time applications. In one example, these values are established by a system administrator.

Each processor consumption limit value specifies the amount of processor resources that can be allocated to, for instance, one or more real-time applications. This number is chosen such that other types of applications and work on the system can concurrently execute. As described further below, different real-time applications can be associated with different limit values or they can have the same limit value. Similarly, processor consumption limits can be associated with non-real-time applications.

Each processor consumption maximum value specifies a cap on the amount of processor resources that can be used by, for instance, one or more real-time applications or by one or more non-real-time applications. In one embodiment, these values are greater than the limit values, since, as is known, during processing, there may be a temporary surge in the delivery of a data stream causing the amount of allocated resources to be exceeded. Thus, each maximum value provides a buffer in case one or more processing applications needs a little more processor consumption than specified by the processor consumption limit value. The amount of resources consumed by the application(s) cannot exceed this cap. This guarantees that the additional work on computer system 100-A is provided with a selected amount of processor resources. As described below, different applications can be associated with different maximum values or they can have the same maximum value.

In one embodiment, the processor consumption limit and maximum values are expressed in terms of processor service units. This is only one example, however. Those skilled in the relevant art will recognize that other units of measurement may be chosen without departing from the spirit or scope of the present invention.

Subsequent to reading in the limit and maximum values, the workload manager takes each processor consumption limit and maximum pair and establishes a resource group to which individual work units of applications are assigned. This allows different limits and maximums to be specified for different applications. For example, real-time Applications A and B may be assigned to Resource Group 1 and have a limit of 500 and a maximum of 550; while, real-time Application C is assigned to Resource Group 2 with a limit of 200 and a maximum of 210. Similarly, non-real-time Applications D and E are assigned to Resource Group 3 with a limit of 2500 and no maximum. In the above examples, real-time and non-real-time applications are in separate groups. This is only one example. In other embodiments, a group may include varying types of applications. The limits and maximums are chosen for a particular group; thus, the group, as a whole, cannot exceed these values.

Each resource group is represented in the memory allocated to the operating system by a resource group table entry 130. In one embodiment, resource group table entry 130 includes:

(a) A resource group name 132, which is an input value to the workload manager indicating the name of the resource group corresponding to this resource group entry;

(b) A processor consumption maximum value 134, which as described above, is an input value specifying a cap on the amount of processor resources allowed to be consumed by the one or more applications of this resource group;

(c) A processor consumption limit value 136, which as described above, is an input value specifying how much processor resources can be allocated to the one or more applications of this group;

(d) Processor use data 138, which includes various measured and computed data to be explained in further detail below; and (e) A cap slice pattern 140, which are computed values indicating the specific time slices when one or more work units in the resource group should be capped, as described in further detail below.

In addition to the above, workload manager 116 reads in as input performance goals of computer system 100-A, including their relative importance, and establishes a user performance goal class to which individual work units (of, for instance, a resource group) are assigned. Performance goals are associated with both real-time and non-real-time applications. A goal class may or may not be associated with a resource group. Work units that are not a part of a resource group can still be a part of a goal class. Additionally, more than one class may be assigned to a resource group.

In accordance with the principles of the present invention, the processor consumption limit values, the processor consumption maximum values, and the goals are multisystem-wide values and goals. That is, the same values and goals are used by any of the computer systems of the multisystem environment that are participating in the management capabilities of the present invention. The values and goals are stored, for instance, in an external storage device 141 (e.g., DASD) coupled to one or more of the computer systems of the multisystem environment, such that the systems needing the information can readily obtain the information.

Performance goals and user performance goal classes are described in detail in "Apparatus and Method for Managing A Data Processing System Workload According to Two or More Distinct Processing Goal Types," by J. D. Aman et al., U.S. Pat. No. 5,473,773, Issued on Dec. 05, 1995; and "Multi-System Resource Capping" by C. K. Eilert et al., Ser. No. 08/383,042, filed on Feb. 03, 1995, now abandoned both of which are assigned to the same assignee as this application and both of which are hereby incorporated herein by reference in their entirety.

Each user performance goal class is represented in the memory allocated to the operating system by a class table entry 142. Class table entry 142 includes, for instance:

(a) A resource group name 144, which is an input value specifying the resource group to which the user performance goal class belongs, assuming there is a resource group. If there is no resource group, this field is left blank;

(b) A user performance goal 146, which is an input value indicating the particular performance goal of the class. One example of a performance goal includes a desired response time;

(c) A relative importance of the user performance goal 148, which is also an input value specifying the importance of this particular goal to the computer system;

(d) A dispatching priority 150, which is set by controller 158, indicates the order in which the work units of this class (as a whole) are to be dispatched relative to other classes of the system; and (e) A real-time server bit 152, which indicates whether the work units in this class are a part of a real-time serving application. This bit is set, in accordance with the principles of the present invention, as described below.

In addition to the workload manager, operating system 102 includes system resource manager 118. The system resource manager is the component of the operating system that manages the resources (e.g., CPU utilization) of the computer system. In one embodiment, system resource manager 118 includes a multisystem goal driven performance controller (MGDPC) 158, which provides a feedback loop for the incremental detection and correction of performance problems so as to make the operating system adaptive and self-tuning, as described in further detail below.

Embodiments of a system goal driven performance controller are described in detail in "Apparatus and Method for Managing A Data Processing System Workload According To Two or More Distinct Processing Goal Types," by J. D. Aman et al., U.S. Pat. No. 5,473,773, Issued on Dec. 05, 1996; "Multi-System Resource Capping" by C. K. Eilert et al., Ser. No. 08/383,042, filed on Feb. 03, 1995, now abandoned; and in "Apparatus and Method for Managing a Distributed Data Processing System Workload According To A Plurality of Distinct Processing Goal Types" by C. K. Eilert and P. Yocom, U.S. Pat. No. 5,675,739 issued on Oct, 7, 1997, all of which are assigned to the same assignee of the present invention, and each of which is hereby incorporated herein by reference in its entirety.

Further details of controller 158 that are particularly relevant to the present invention are described in detail herein. In accordance with the principles of the present invention, controller 158 is responsible for processing the processor use data of the present invention; calculating performance indexes and adjusting system resource controls to manage the achievement of user performance goals; and adjusting the capping of processor resource consumption to ensure that real-time applications do not overrun the system, each of which is described in detail further below.

Operating system 102 further includes dispatcher 120, which is used to select the work unit to be executed next by computer system 100-A. Each work unit is represented by one of the work unit control blocks 122. Each work unit control block, which is stored in memory allocated to operating system 102, includes, for instance, the following three dispatch control fields:

(a) A dispatch priority field 154, which indicates to dispatcher 120 the order in which the dispatcher should look to dispatch work. One example of dispatch priority order is depicted in FIG. 2.

Figure 2:
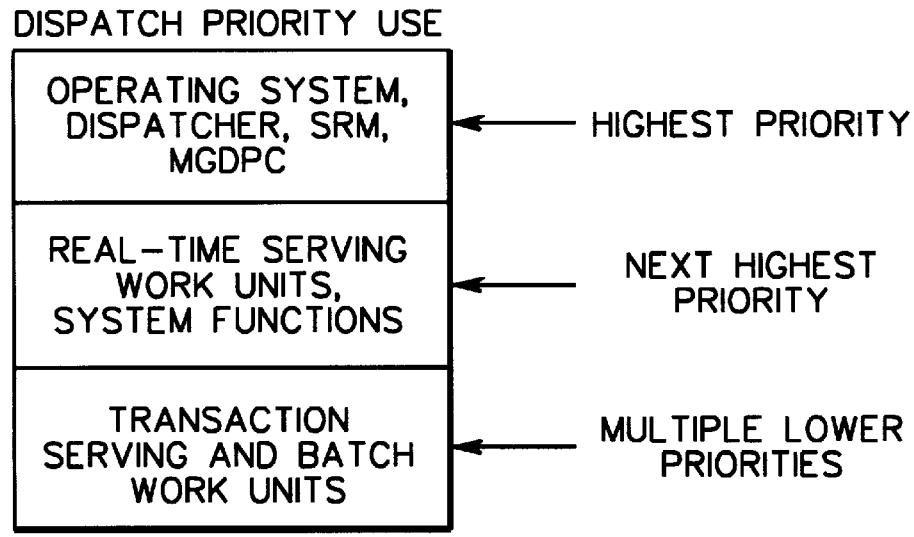
FIG. 2 depicts one example of dispatching priorities used in accordance with the principles of the present invention.

As shown in FIG. 2, in one embodiment, the highest dispatch priority is reserved for the operating system, the dispatcher, the system resource manager and the multisystem goal driven performance controller, while the next highest priority is used for the work units of the real-time applications and for system functions.

The multiple lower priorities are reserved for work units of transaction serving and batch applications. The multiple lower priorities are assigned by operation of the multisystem goal driven performance controller, as described in detail in the aforementioned patent and patent applications, each of which has been incorporated herein by reference in its entirety.

(b) A preemption bit field 156 (FIG. 1), which indicates to the dispatcher that the associated work unit should be considered for dispatch, as soon as it becomes ready.

(c) A cap bit field 158, which indicates to the dispatcher whether the associated unit of work may be dispatched. This bit is used to control the amount of processor execution time allowed for a particular group of work units, as described in further detail herein.

In accordance with the principles of the present invention, various components of the computer system are used to provide a selected amount of a processor resource (e.g., CPU time) to real-time applications and a selected amount to other types of work on the system. One embodiment of the logic associated with processing a real-time application, in accordance with the principles of the present invention, is described in detail with reference to FIG. 3.

Figure 3:
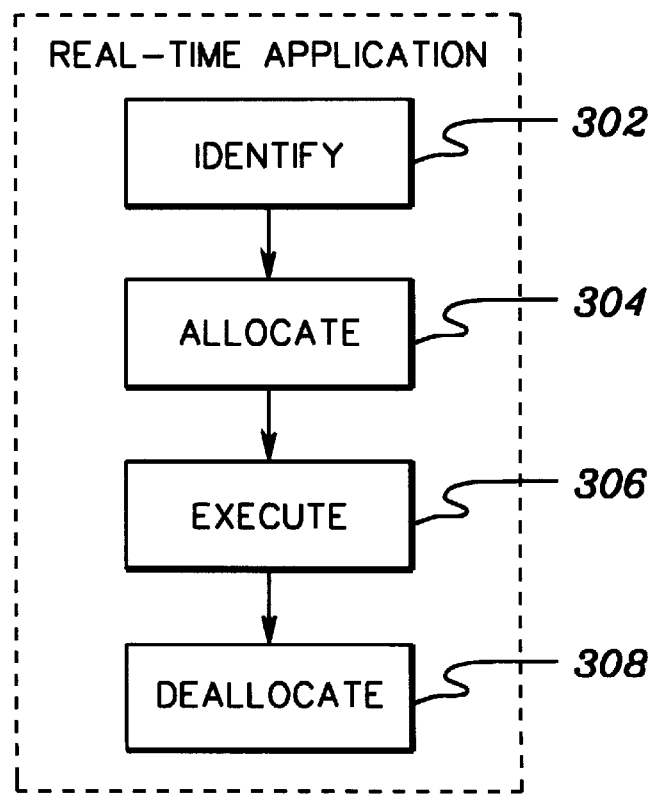
FIG. 3 depicts one embodiment of the logic used in connection with processing real-time applications, in accordance with the principles of the present invention.

Referring to FIG. 3, initially, a real-time application that wishes to execute, identifies itself to system resource manager 118 on each system that may run the application, STEP 302. (Each of those systems includes a copy of the real-time application.) This allows the resource manager to make any adjustments necessary to ensure the real-time application has sufficient resources to process smoothly and uninterrupted, but does not overrun the other work on the system. One procedure for identifying an application to a system resource manager is described in detail with reference to FIG. 4. The functions described in FIG. 4 are performed, in one example, by system resource manager 118.

Figure 4:
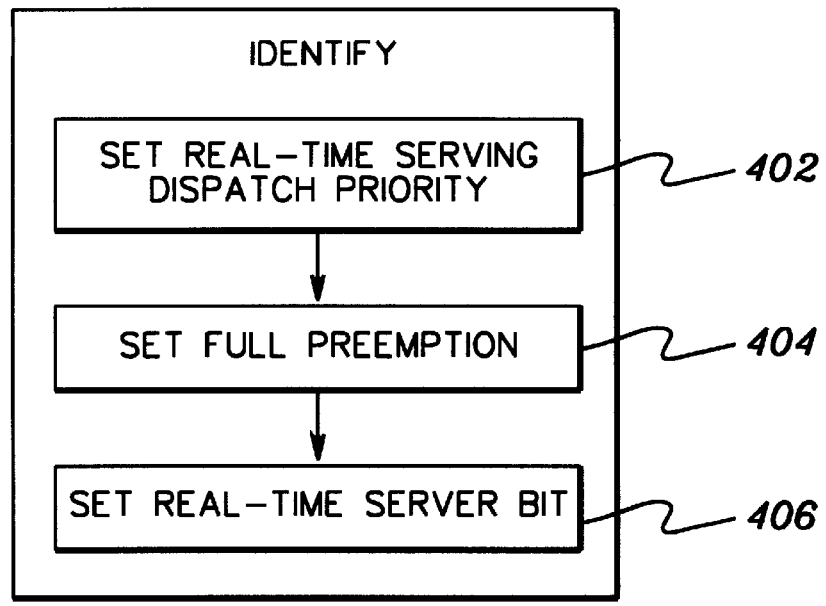
FIG. 4 depicts one example of the logic associated with the identify feature of FIG. 3, in accordance with the principles of the present invention.

Referring to FIG. 4, as one example, initially, dispatch priority 150 in class table entry 142 and priority 154 in each individual work unit control block 122 associated with the identifying real-time application, are set to the "next highest priority," which is designated for real-time applications, STEP 402.

Thereafter, each preemption bit 156 in the individual work unit control blocks 122 for the real-time application is set indicating to the dispatcher that the associated units of work should be considered for dispatch, as soon as they are available, STEP 404.

Additionally, real-time server bit 152 of class table entry 142 is set, indicating to multisystem goal driven performance controller 158 that the work units in the class are real-time servers and the dispatch priority is not to be adjusted, STEP 406.

Subsequent to setting the dispatch priorities, the full preemption bits and the real-time server bit, the identify function is complete. Thus, returning to FIG. 3, the next task for the real-time application is to allocate resources to the application, STEP 304.

One embodiment of an allocate technique is described in detail with reference to FIGS. 5–9. The logic of FIGS. 6–9 uses various processor use data, which are described in detail with reference to FIG. 5. After the data is described, then one embodiment of the allocate logic is described.

Figure 5:
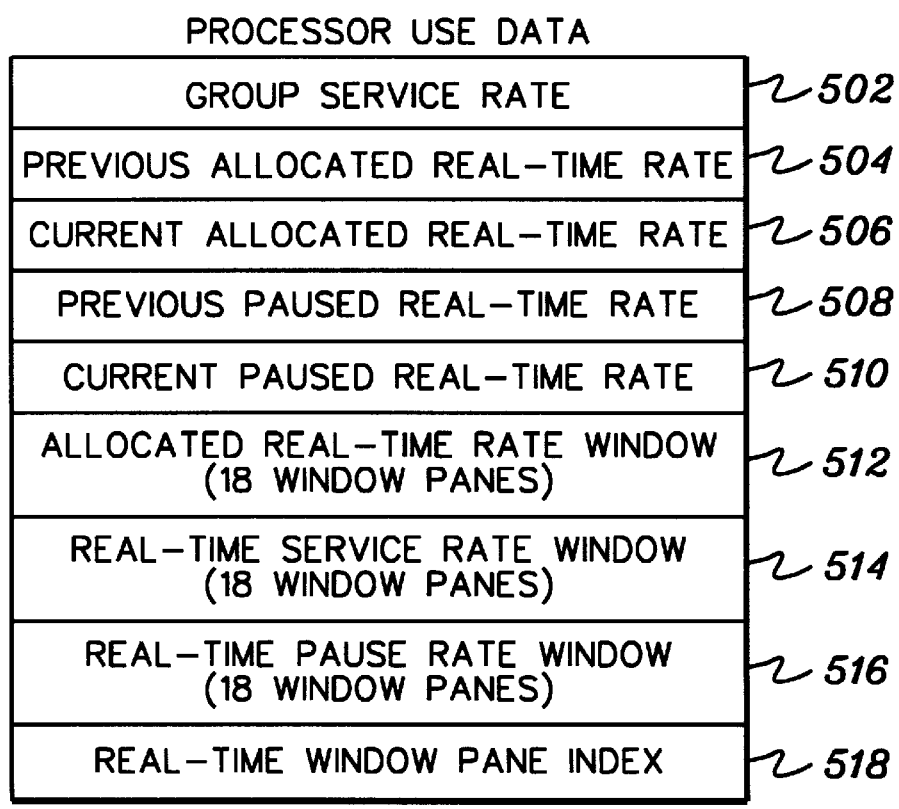
FIG. 5 depicts one example of processor use data, used in accordance with the principles of the present invention.

Referring to FIG. 5, one example of processor use data 138 of the present invention includes the following:

(a) A group service rate 502, which indicates the current service consumed (e.g., CPU consumption) by work units in the group. This rate is usually expressed in service units/second, however this is not necessary;

(b) A previous allocated real-time rate 504, which is filled in by the multisystem goal driven performance controller when the performance controller is invoked, for instance, once every 10 seconds. The performance controller copies a current allocated real-time rate, described below, into the previous allocated real-time rate.

(c) A current allocated real-time rate 506, which represents the amount of capacity units, for example, in KB/second, currently allocated for delivery of real-time data streams of the group. The processor cost to move a byte of data from disk to the communication network is close enough to a constant to use KB/second as a unit of capacity and KB/second is a meaningful unit to real-time serving applications. A real-time serving application requests capacity in KB/second. The current allocated real-time rate is filled in by the allocate and deallocate functions, described below.

(d) A previous paused real-time rate 508, which is filled in by multisystem goal driven performance controller 158, when controller 158 is invoked, for instance, once every ten seconds. Controller 158 copies the current paused real-time rate, described below, into the previous paused real-time rate field.

(e) A current paused real-time rate 510 includes a summation of the data rates for any paused real-time data streams of the group, as described in further detail below.

(f) An allocated real-time rate window 512 is a window of data, which includes, for example, eighteen (18) window panes. In particular, the allocated real-time rate is kept over a moving window of time. The moving window of time is defined, for example, as the most recent three minutes. The 180 second window is divided into eighteen intervals of ten seconds each, referred to as eighteen window panes, and implemented as an eighteen element array. The allocated real-time rate window panes are filled in by controller 158 when controller 158 is invoked once every ten seconds, if there was real-time serving activity during the previous ten second interval. The allocated real-time window pane is calculated by taking the average of the previous and current allocated real-time rates.

(g) A real-time service rate window 514 is another window of data that includes, for instance, eighteen (18) window panes. The real-time service rate represents the processor service consumed by the real-time application work units that deliver the real-time data stream. The real-time service rate window panes are filled in by controller 158 when it is invoked once every ten seconds, if there was real-time serving activity during the previous ten second interval. The real-time service rate window pane value is copied from the group service rate field.

(h) A real-time pause rate window 516 is a third window of data, which also includes eighteen (18) window panes, as one example. The real-time pause rate is the data rate that represents real-time data streams of this group that are currently paused. Like the other two data windows, the pause rate window panes are filled in by controller 158 when it is invoked once every ten seconds, if there was real-time serving activity during the previous ten second interval. The paused real-time rate window pane value is calculated by taking the average of the previous and current paused real-time rates.

(i) A real-time window pane index 518 represents the current index for the window pane array elements. Data for the current ten second interval is stored in the window pane array element indexed by the current window pane index. The eighteen array elements of each window array are used in rotation. After the eighteenth element is used, data for the next time interval is stored in the first element, replacing the old data in that element. The real-time window pane index is advanced by controller 158, if there was real-time serving activity during the previous ten second interval. When there is no real-time serving activity, the index is not advanced. This preserves earlier service cost per KB/second data for use when real-time serving is again started.

As mentioned earlier, the above-described processor use data is used during the allocate function of the present invention. In general, the allocate function of the system resource manager is invoked by the real-time server to allocate and guarantee processor capacity for delivery of a real-time data stream. The input value of the allocate function is the KB/second data rate for the real-time stream. During allocate, the highest processor service cost per KB/second for the systems of the multisystem environment is located. Then, this value is used to determine the service requirements for the new stream. Thereafter, a check is made to determine if the required processor capacity is available within group service limit 136 specified by the system administrator. Further details of one embodiment of the allocate function is described with reference to FIG. 6.

Figure 6:
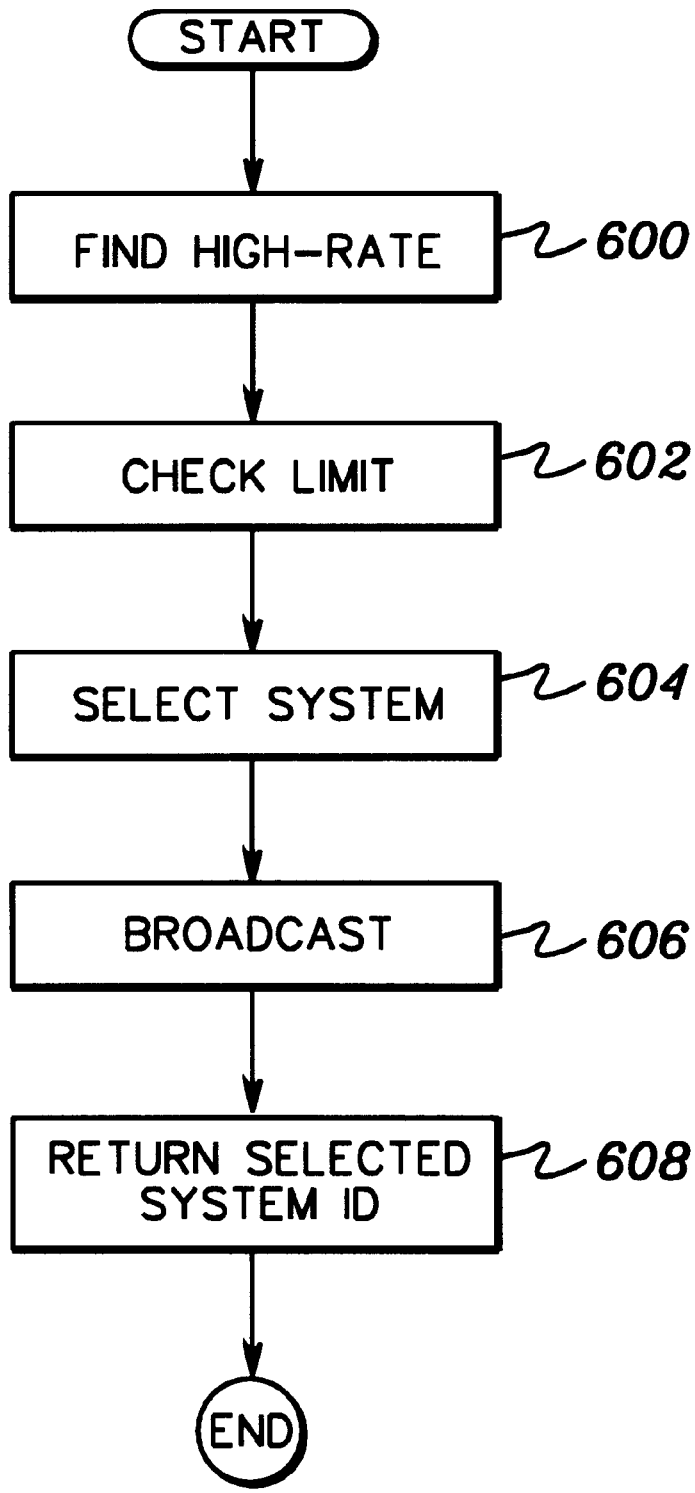
FIG. 6 depicts one embodiment of the logic used to allocate processor resources to a real-time application, in accordance with the principles of the present invention.

Referring to FIG. 6, initially, multisystem data is searched to find the highest service rate per KB for any of the systems of the multisystem environment for delivering a real-time data stream, STEP 600. As one example, the multisystem data is stored in a system data table, which is located in the memory allocated to the operating system.

Figure 7:
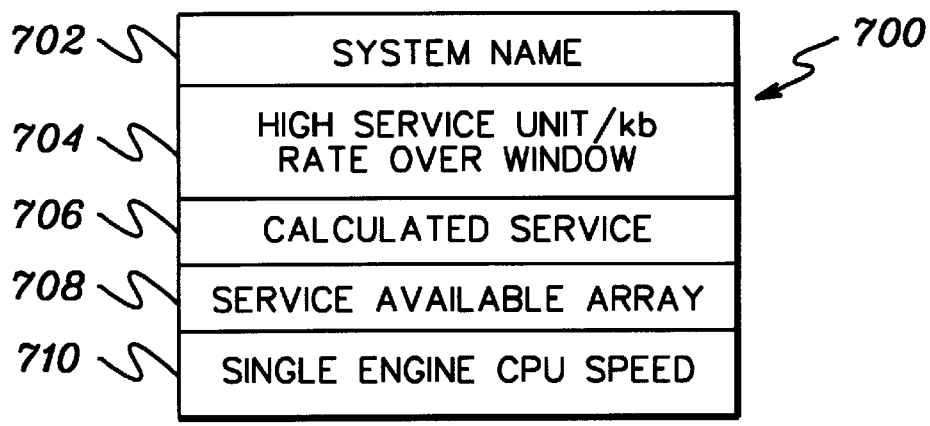
FIG. 7 depicts one example of an entry of a system data table used in accordance with the principles of the present invention.
Figure 8:
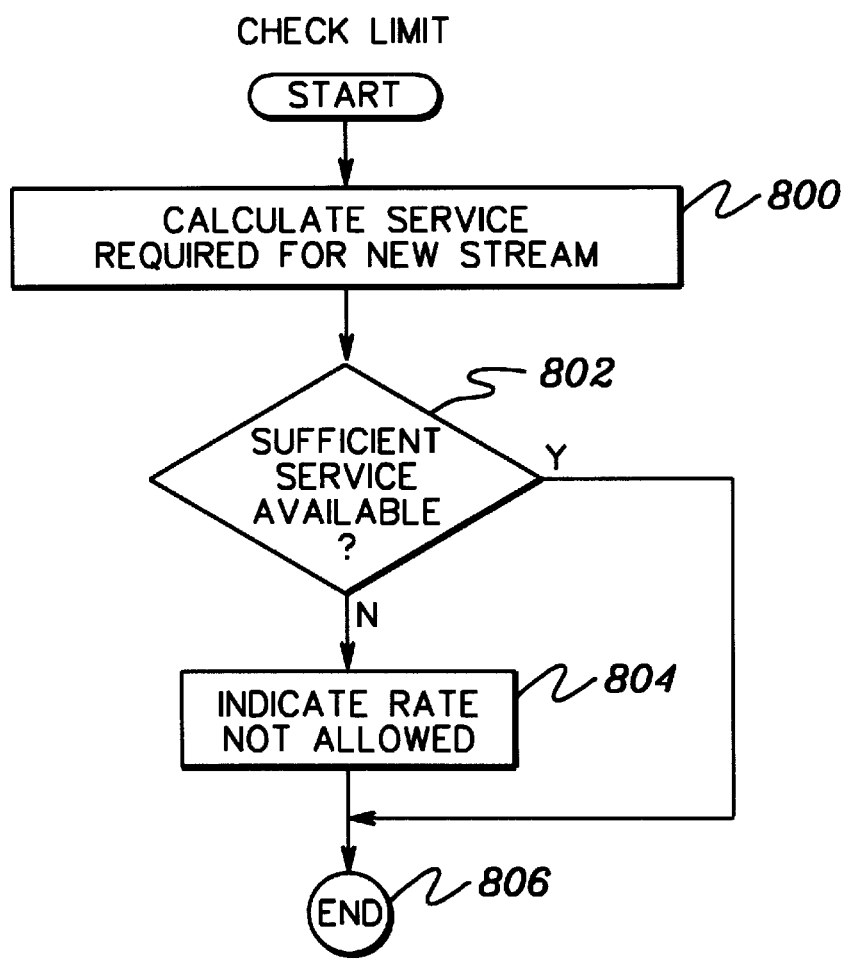
FIG. 8 depicts one embodiment of the logic used to check whether there is sufficient capacity on a system to deliver a real-time data stream, in accordance with the principles of the present invention.
Figure 12:
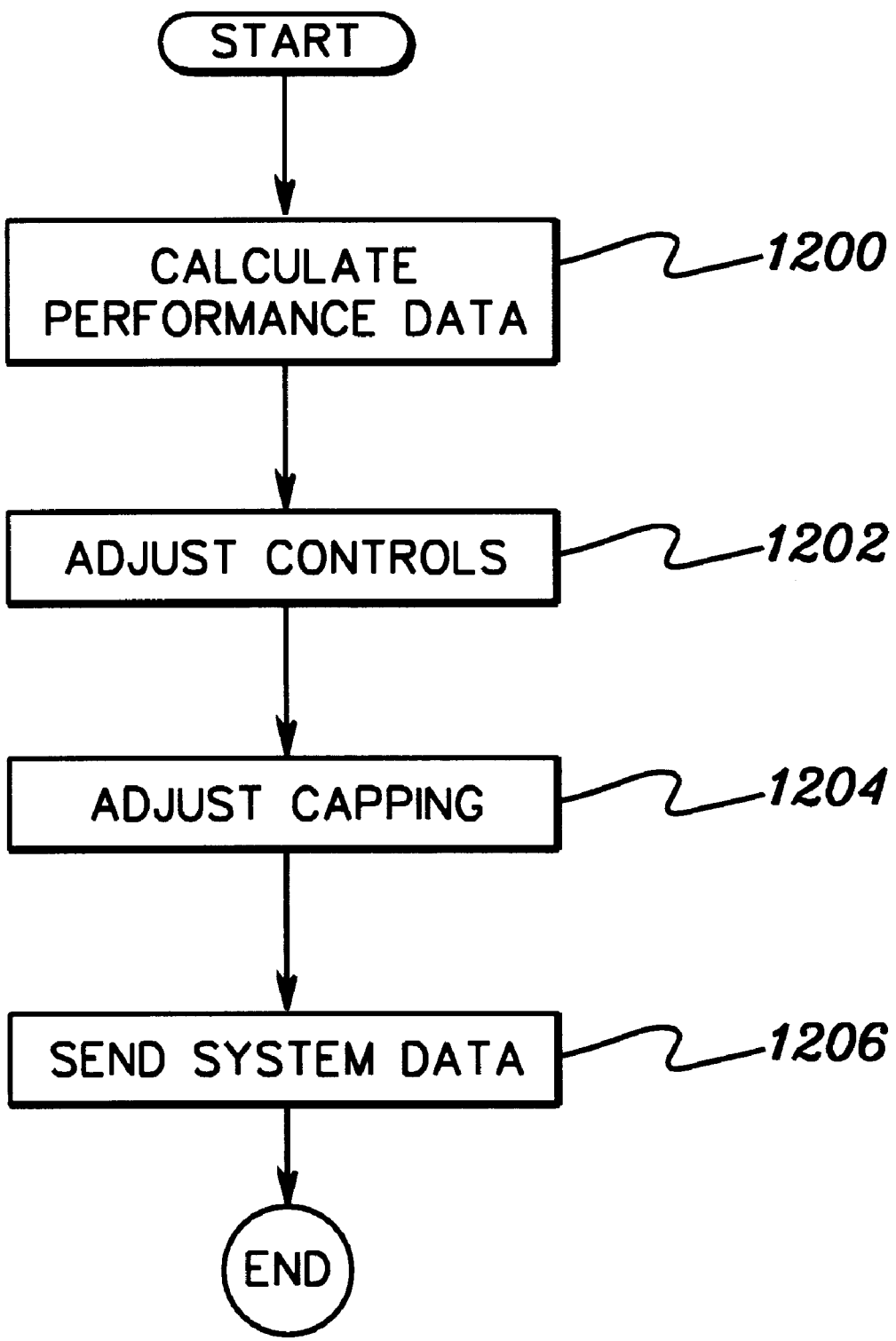
FIG. 12 depicts one example of various operations of a multisystem goal driven performance controller (MGDPC) of the present invention.

One embodiment of an entry 700 of a system data table is depicted in FIG. 7 and described in detail below. As one example, there is an entry in the system data table for each system of the multisystem environment and each entry includes the following information:

(a) A system name 702, which identifies the name of the system to which this entry belongs;

(b) High Service Unit/KB Rate Over Window 704, which is the highest service units per KB/sec rate over the 18 pane window for a particular system. One example of how this is calculated is described below with reference to STEP 1200 (FIG. 12).

(c) A Calculated Service 706, which represents the service calculated to be used by data streams started, since the last periodic (e.g., 10 second) invocation of controller 158. The purpose of this is interim bookkeeping of allocated service so each system has an up-to-date view of the service expected to be seen on each system. This prevents allocation over the limit during the 10 second interval, and provides up-to-date information about the available capacity on the computer system. One example of how this is calculated is described below.

(d) A Service Available Array 708, which indicates the service available at each importance and the unused service. In one example, the array includes an entry for each importance (e.g., importances 0–6) and one for unused service, as depicted below.

--- array element 1 service avail. at importance 0
array element 2 service avail. at importance 1
array element 3 service avail. at importance 2
array element 4 service avail. at importance 3
array element 5 service avail. at importance 4
array element 6 service avail. at importance 5
array element 7 service avail. at importance 6
array element 8 unused service

---

In the one example described herein, the most important/highest importance is importance 0 and the least important/lowest importance is importance 7.

In one example, the service data is calculated and averaged over a 6 pane window, as described in detail below.

(e) Single Engine CPU Speed 710, which represents the CPU speed per engine in service units per second.

Returning to FIG. 6, subsequent to locating in the system data table the highest rate for all of the systems, a check is made to determine if the required processor capacity, calculated below, is available within group service limit 136, STEP 602. One embodiment for performing this check is described in detail with reference to FIG. 8.

Initially, the service required to deliver a new real-time data stream is calculated, STEP 800, as follows:

$$KB \text{ For New Stream} \times \text{Highest Service Rate Per } KB \text{ In Window,}$$

in which the KB for the new stream is an input value and the highest service rate is that rate located above in the system data table.

After the amount of needed service (i.e., the service rate) is calculated, a determination is made as to whether that amount of service is available within group service limit 136, INQUIRY 802. If sufficient capacity is not available, an unsuccessful return code is set, STEP 804, and the check limit function as well as the allocate function is complete, STEP 806.

If, however, there is sufficient capacity to deliver the real-time data stream, then the check limit function is complete, STEP 806.

Returning to FIG. 6, if there is sufficient capacity to deliver the real-time data stream, the next step of allocate is to select the system on which the real-time server application will run the request that is being allocated, STEP 604. As described above, allocate still checks that there is sufficient capacity within the limit, but it also decides, in accordance with the principles of the present invention, which system the new request should be run.

In one example, there is an input to allocate, which indicates the list of systems on which the new request could possibly be started. For example, all systems might not be connected to devices storing all the videos that might be requested. A video might be accessible (on disk, for example) to systems A, B, and C, but not to system D. The real-time server application knows where the videos are, and it passes the list of eligible systems to allocate. Allocate (i.e., the system resource manager) then selects the best system from among the eligible systems, as described in detail below.

Figure 9:
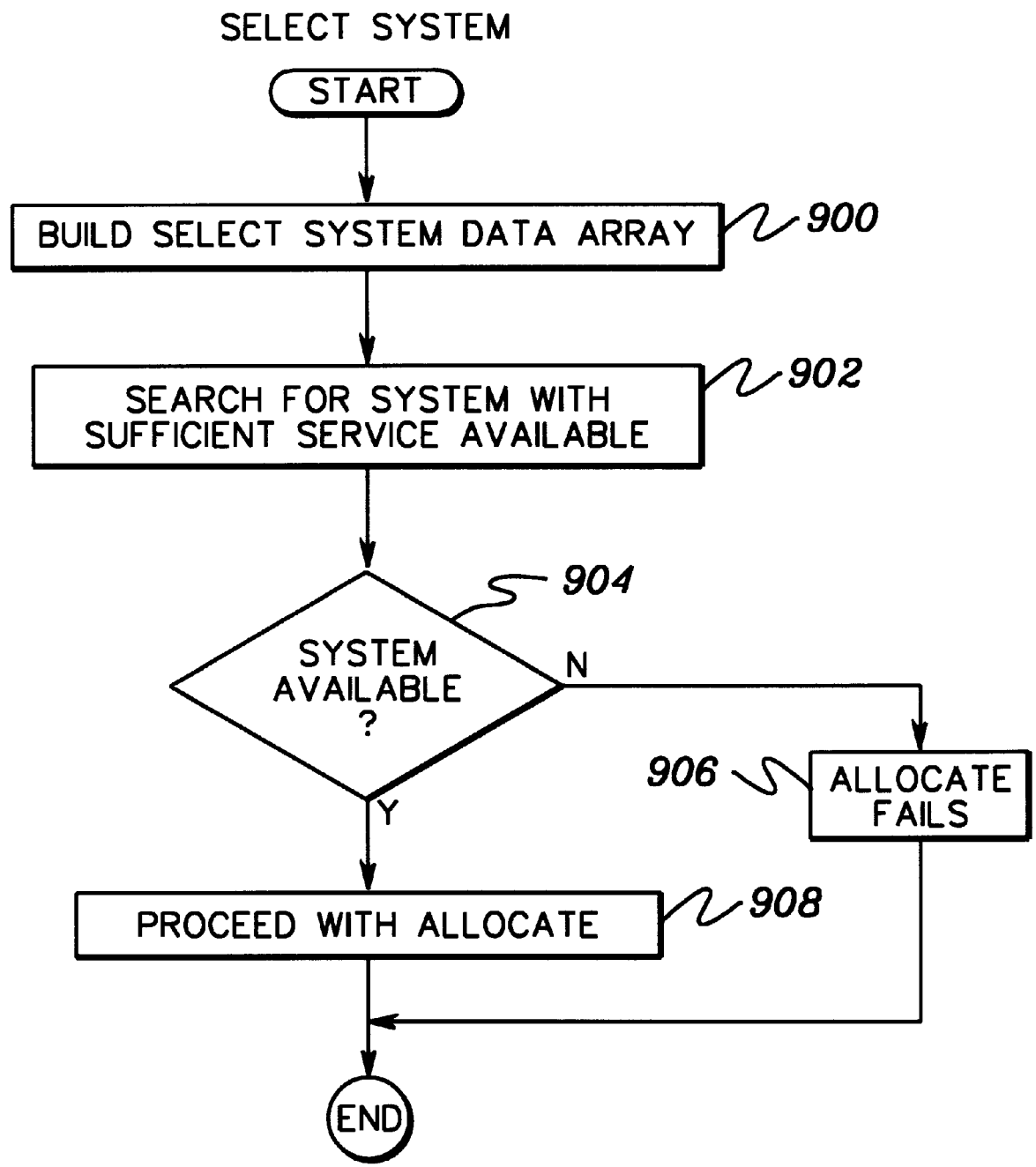
FIG. 9 depicts one embodiment of the logic used to select a system to deliver a real-time data stream, in accordance with the principles of the present invention.

One embodiment of the logic used to select the system is described in detail with reference to FIG. 9. Initially, a select system data array is created using the system data table, STEP 900. In one example, the select system data array includes the system name, the service calculated to be used by streams started on the system in the last interval, and the service available array, for each system that is eligible to be selected to serve the stream to be allocated. The list of eligible systems in an input parameter to allocate. The systems are in the array in CPU-speed order, as one example.

Subsequent to building the array, the array is searched in an attempt to find a system with sufficient service available to deliver the real-time data stream, STEP 902. In one example, the logic searches in the array across systems and up the importances until it finds a system, if any, with sufficient service available at the lowest importance to serve the data stream. In particular, the first check is to look for unused service on the eligible systems. This is importance array index 8. If there is no such system with enough unused service to serve the stream, the search proceeds up the importances until a system is found, if any.

In one example, during each check for available service, the service for the streams started on the system during the last interval (stored in the select system data array) is subtracted out of the service available at the importance being checked. This is in an attempt to keep from selecting systems before the service to be used by other streams has had a chance to show up in the data.

If a system with sufficient service is not available, then the allocate fails, STEP 906. In one embodiment, this is true even if there is sufficient service available within the limit (i.e., the available service is fragmented across more than one system), but there is not sufficient service available on any one system.

If, however, a system with sufficient service is available, then the allocate proceeds, STEP 908.

One example of pseudocode used in selecting a system is depicted below. In the pseudocode, "name" refers to the system name, "started_stream_service" refers to the service for streams started in this interval, and "serv_avail" refers to the service available array.

---

Select System Pseudocode variables
    new_stream_service_rate is the service rate
        required to serve the new stream to be
        allocated. new_stream_service_rate was
        calculated by allocate.
    system_selected is the system name to be passed
        back to the caller of allocate.
    imp is a loop index to loop through the importance
        level data in the select system data array.
    sys is a loop index to loop through the data-by-
        system in the select system data array.
initialize
    Set system_selected to "blank" to indicate no
        system selected.
    do imp = 8 to 1 by −1 while(system_selected="blank")
        do sys = 1 to number_of_eligible_systems
            while (system_selected="blank")
        if serv_avail(imp,sys) −
            started_stream_service(sys) >=
            new_stream_service rate
        set system_selected to name(sys)
    end
end

---

Returning to FIG. 6, after selecting the system on which the request is to be run, the selected system identifier (e.g., the system name), the service required for the new stream, as calculated in STEP 800 (FIG. 8), and the new rate is broadcast (by a conventional broadcast mechanism) to all the other systems of the multisystem environment, STEP 606. In particular, a receive allocate data function on each system receives the information and adds the service to the system data table entry for the selected system (i.e., calculated service 706 of FIG. 7). Additionally, the selected system adds the new rate to the current allocated rate of the processor use data.

Thereafter, the selected system identifier is returned to the real-time server application, STEP 608.

Returning to FIG. 3, after the allocate function is performed, then the real-time serving application can be executed thereby delivering a real-time data stream, STEP 306. The application executes on the system selected by allocate.

After the real-time application no long needs the processor resources allocated to deliver the real-time data stream, the resources are deallocated using a deallocate function, STEP 308. In particular, the real-time server invokes the deallocate function of the system resource manager of the system selected to execute the application. This indicates that a real-time data stream has ended and will no longer consume the allocated processor resources.

Figure 10:
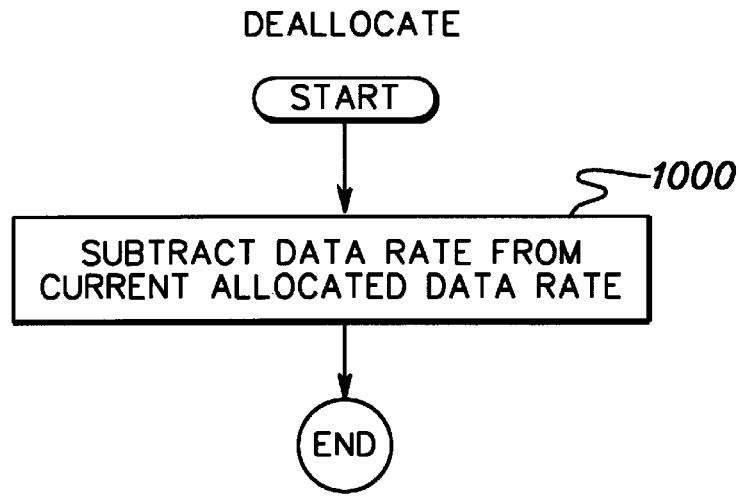
FIG. 10 depicts one embodiment of the logic used during deallocation of the resources allocated to a real-time application, in accordance with the principles of the present invention.

One embodiment of the deallocate function is described with reference to FIG. 10. In one example, in order to deallocate the processor resources, the input data rate is subtracted from current allocated real-time rate 506, STEP 1000. Thus, the current rate indicates those resources are available for delivering additional data streams. Thereafter, deallocate is complete.

In accordance with the principles of the present invention, during delivery of a real-time data stream, the client may decide to pause the viewing. In such a case, the real-time server invokes the pause function of the system resource manager on the system selected to execute the application. This indicates that the client viewing the real-time data stream has paused viewing, for instance, the video. Paused streams do not contribute to processor consumption, but the processor time that they require is still reserved. Thus, the data rate for paused streams is used in the calculations. One embodiment of the pause function is described in detail with reference to FIG. 11. Additionally, a resume function is described as well. Similar to the pause function, the resume function is also invoked on the system selected to run the application.

Figure 11:
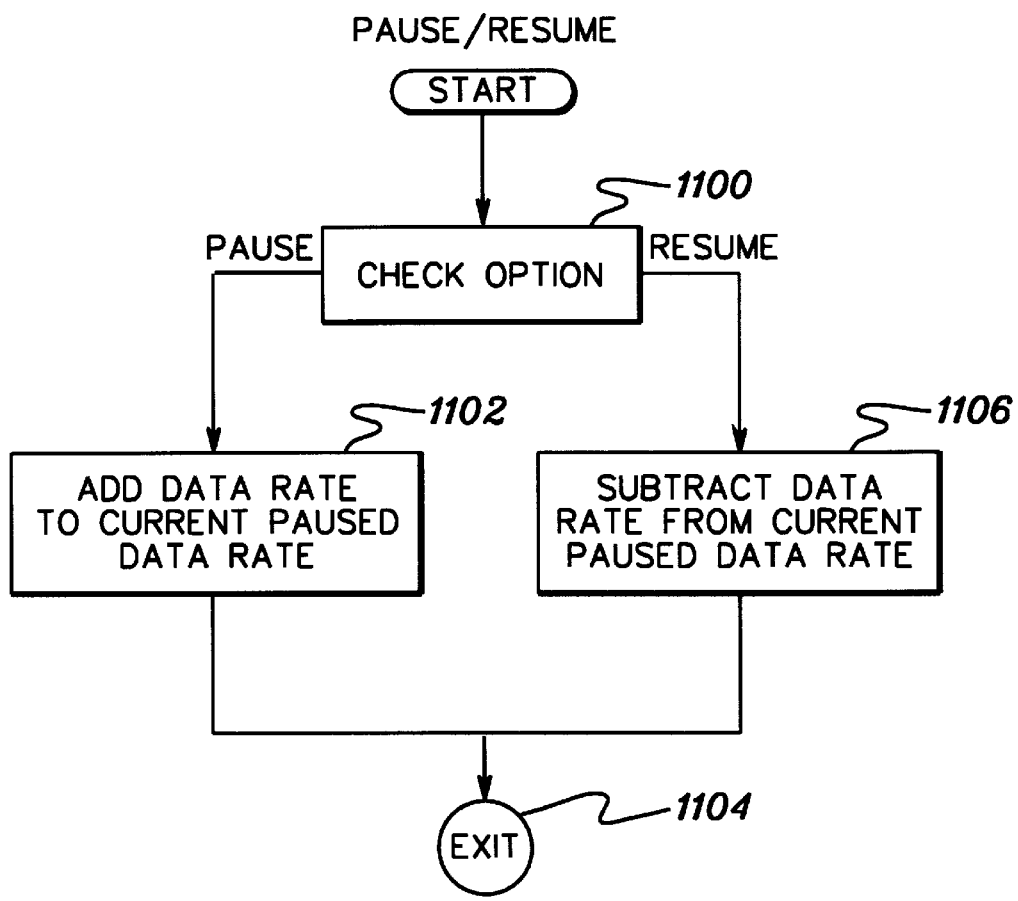
FIG. 11 depicts one embodiment of the logic used during a pause/resume of the execution of a real-time application, in accordance with the principles of the present invention.

Referring to FIG. 11, initially, a check is made to determine whether the client is pausing the delivery of a real-time data stream or resuming delivery after a pause, INQUIRY 1100. If the option is pause, then the input data rate is added to current paused real-time rate 510, STEP 1102. Thereafter, the pause function of the present invention is complete, STEP 1104.

If, on the other hand, the option is resume, then the input data rate is subtracted from the current paused data rate, STEP 1106, and the resume function is complete, STEP 1104.

In accordance with the principles of the present invention, each multisystem goal driven performance controller 158 calculates performance data for its system, as well as monitors system resource utilization and adjusts certain controls based on the monitoring. In one example, this is performed on predefined time intervals, such as every 10 seconds. One example of the operations performed by controller 158 is described in detail below with reference to FIG. 12.

Figure 13:
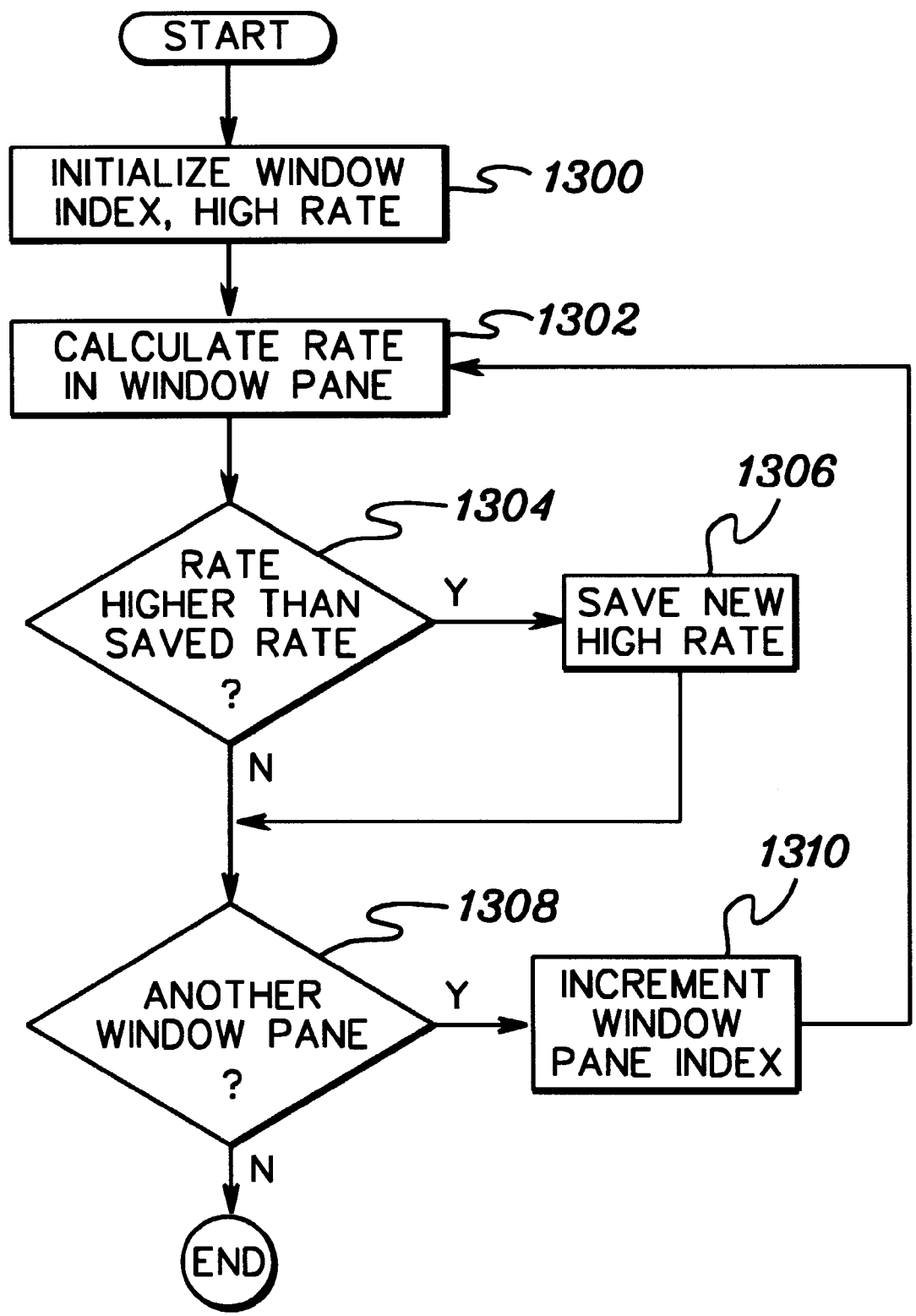
FIG. 13 depicts one embodiment of the logic used to calculate the high service unit rate for a particular system, in accordance with the principles of the present invention.

In one embodiment, the multisystem goal driven performance controller calculates performance data for the system, STEP 1200. In one example, it calculates the highest service units per KB/sec rate over the 18 window pane for its system. This calculation is performed once every 10 seconds, in one example. One embodiment of determining the highest rate is depicted in FIG. 13 and described below.

Initially, window pane index 518 is set to point to the first window pane for the window pane scan, and a variable, referred to as high rate, is initialized to zero, STEP 1300. Thereafter, the service cost of delivering a KB/second (data rate) is calculated as follows:

---
Real-Time Service Rate Window 514 ÷
(Allocated Real-Time Rate Window 512 −
Real Time Pause Rate Window 516), STEP 1302.
---

The value calculated at STEP 1302 is the current service rate, which is also referred to as the new rate. The new rate is checked against the saved high rate, INQUIRY 1304. If the new rate saved in allocated real-time rate window pane 512 is higher than the high rate, the high rate is set to the new rate, STEP 1306. After saving the new high rate, or if the current service rate is less than or equal to the high rate, a further inquiry is made to determine if there is another window pane, INQUIRY 1308. In particular, the window pane index is compared to 18 and if it is less than 18, then, in this particular case, real-time window pane index 518 is incremented by one, STEP 1310. Control then flows to STEP 1302 "Calculate Rate in Window Pane."

If there are no more window panes, then the saved high rate represents the highest service units per KB/sec rate for this system.

Returning to FIG. 12, the performance controller also adjusts system resource controls, such as dispatching priority, in order to manage the achievement of the user performance goals of its system, STEP 1202.

The adjust system resource controls is performed at certain intervals during the execution of applications on the system, as one example. In one embodiment, controller 158 is invoked every 10 seconds to determine if the system controls need to be adjusted.

In particular, the adjust controls function of controller 158 measures the achievement of the performance goals, selects the user performance goal classes that need their performance improved, and improves the performance of the selected user performance goal classes by modifying the system control parameters (i.e., the controlled variables including, for instance, dispatching priority) of the associated work units. However, before modifying certain parameters, such as dispatching priority, performance controller 158, in accordance with the principles of the present invention, checks real-time server bit 152 to determine if the application is a real-time server application. If the bit is on, indicating the delivery of a real-time data stream, the dispatch priority for the class (priority 150), as well as the dispatch priority in each applicable work unit (priority 154), remains unchanged. This ensures that the real-time data stream is guaranteed a certain amount of resources.

When the real-time server bit is off, then the dispatching priority can be adjusted. Processing of controller 158 for non-real-time applications is described in detail in "Multi-System Resource Capping" by C. K. Eilert et al., Ser. No. 08/383,042, filed on Feb. 03, 1995, now abandoned, which is hereby incorporated by reference in its entirety. However, in accordance with the principles of the present invention, the processor capacity available to the non-real-time serving work units is the total processor capacity minus the processor capacity guaranteed to and used by the real-time serving work units.

In addition to the above, the multisystem goal driven performance controls performs a task, referred to as adjust capping, STEP 1204. Adjust capping also operates similarly to that described in the aforementioned "Multi-System Resource Capping". The adjust capping function determines the amount of time that work units assigned to each resource group should be made non-dispatchable (capped) to limit resource consumption to the maximum value specified for that resource group in resource group maximum 134.

In particular, a length of time (the length is dependent on processor speed), is divided into a number of intervals, such as, for instance 64 intervals, and the adjust capping function calculates the number of intervals work units in each resource group are to be capped. It then sets an indicator corresponding to each of the 64 intervals indicating whether the resource group should be capped during that interval. These indicators form cap slice pattern 140. The cap bits are spread relatively evenly over the 64 intervals, as described in "Multi-System Resource Capping."

A cap bit manipulator function of the system resource manager is invoked during each of the 64 intervals to check the cap bit patterns to determine which resource groups should be capped and sets the cap bits accordingly in the work unit control blocks for the work units. The cap bits are interrogated by dispatcher 120 to determine if a unit of work may be dispatched. In the present invention, a system administrator specifies a maximum value for the real-time serving resource groups and the capping function guarantees that the real-time serving applications consume no more than the specified maximum processor capacity.

Figure 14:
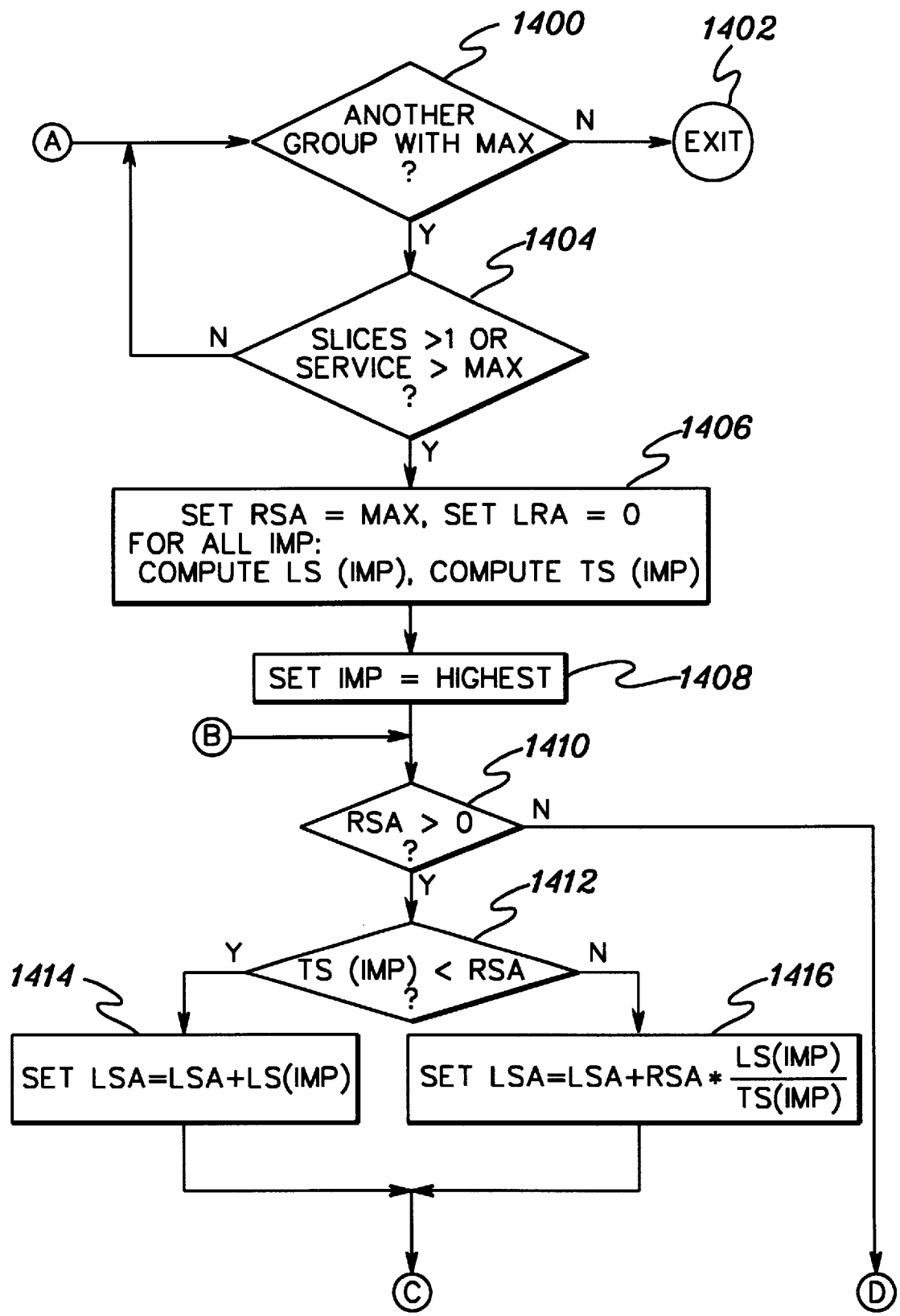
FIGS. 14–15 depict one example of the logic used during a capping function of the operations of the MGDPC FIG. 12, in accordance with the principles of the present invention.
Figure 14A:
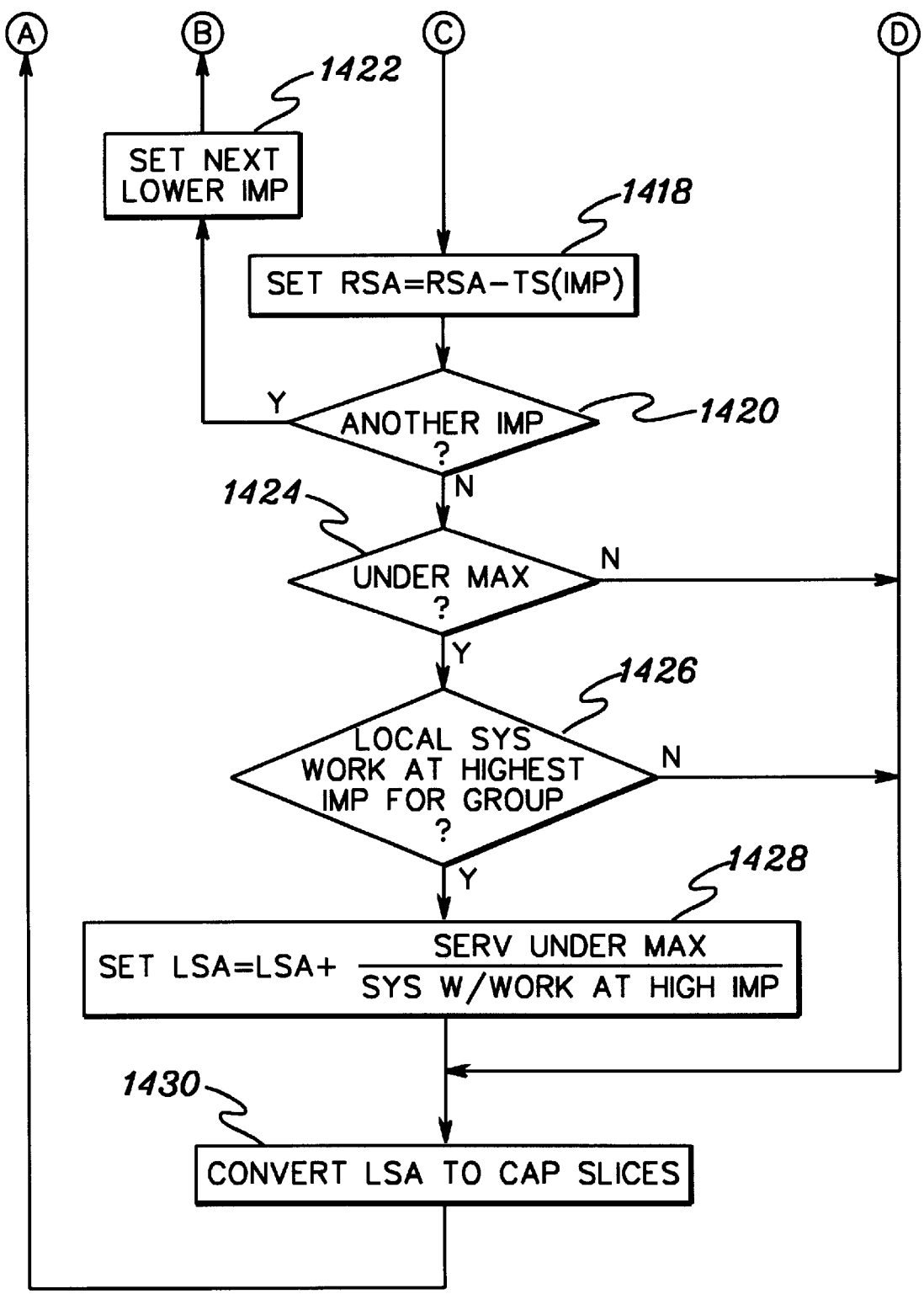
Figure 15:
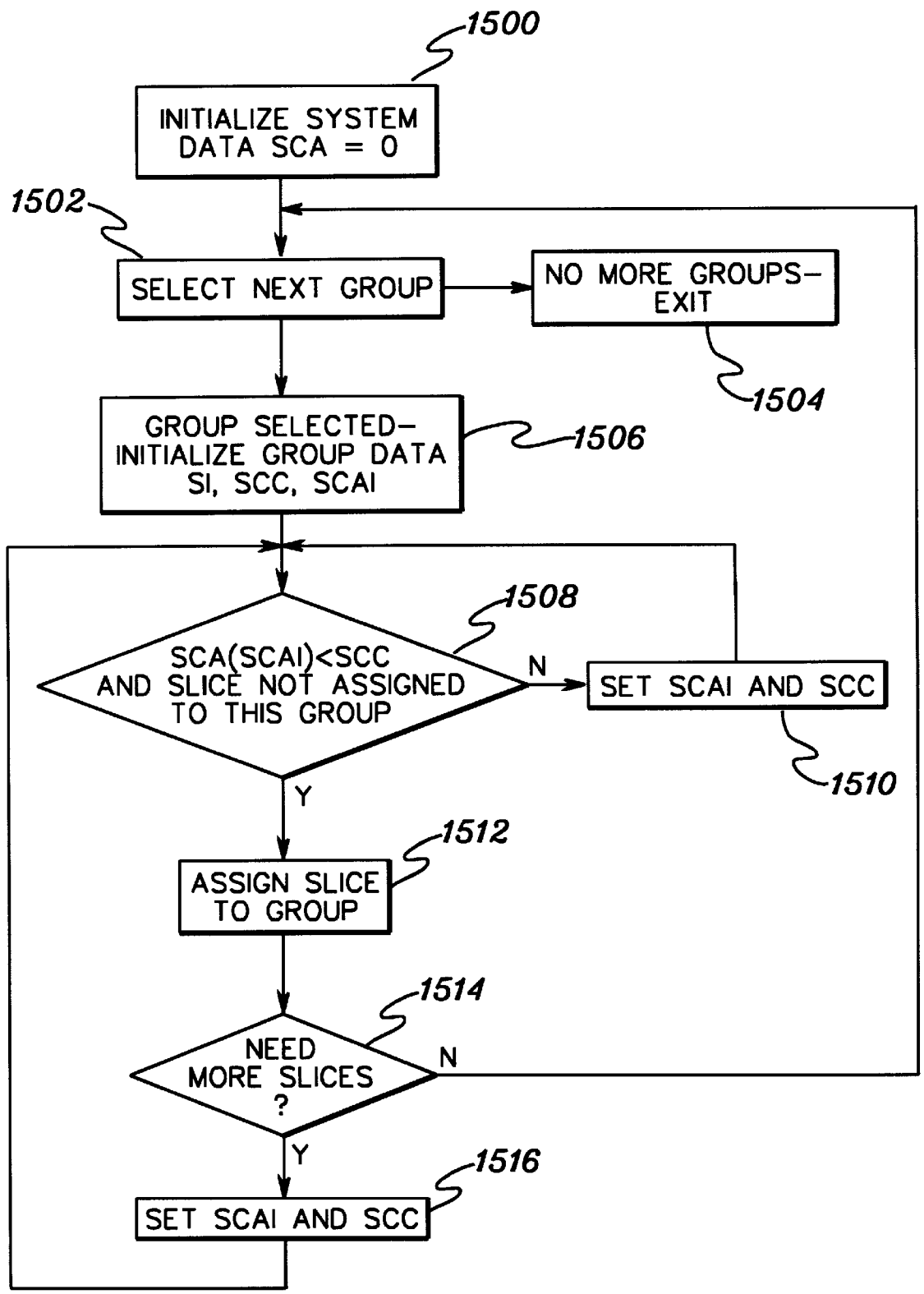

One embodiment of the capping function is described in detail with reference to FIGS. 14–15. FIG. 14 illustrates the control flow used to determine, by resource group, the amount of time that units of work should be capped. Initially, a check is made to determine whether there is another resource group, having a processor consumption maximum, to process, STEP 1400. If not, the function is complete and control flows to STEP 1402 to exit. If there is another resource group to process, a check is made at to determine whether the resource group either has cap slices set currently or is currently consuming more processor time than the specified maximum, INQUIRY 1404.

If the above check is negative, control flows to STEP 1400 to process the next resource group. If, however, the resource group has cap slices set currently or is currently consuming more processor time than the specified maximum, various initializations are performed, STEP 1406. For example, a variable RSA, which represents the remaining processor service units that may be allocated to the resource group, is set to the maximum specified for the resource group, and a variable LSA, which represents the processor service units allowed to be consumed on the local processor is set to zero. The processor service units allowed on the local processor is apportioned based on the consumption and importance of work on the local and all remote processors. The array variables LS and TS are also initialized at STEP 1406. LS and TS are arrays with the number of elements equal to the number of levels of importance. For each importance, the variable LS(IMP) is set to the total service consumed at that importance on the local system over the most recent window of time. This is done by adding the service consumption data at that importance from the six elements of the local processor service-consumed window, described below. The variables TS(IMP), the total service consumed at each importance, are calculated similarly.

Thereafter, the importance variable (IMP) is set to the highest importance to initialize for looping by importance through the processor service units data, STEP 1408. Next, a check is made to determine whether there are any processor service units that may still be apportioned, INQUIRY 1410. If all the processor service units have been apportioned, control flows to STEP 1430 where the number of processor service units apportioned to the local processor is converted to a number of cap slices, as described below.

If there are still processor service units that remain to be apportioned without exceeding the specified maximum, control flows to INQUIRY 1412 where a check is made to determine whether the total amount of processor service units consumed, TS, at the current importance, IMP, on the local plus all the remote systems is less than the processor service units that remain to be apportioned. If the total of processor service units consumed on all systems at the current importance is less than or equal to the processor service units that remain to be apportioned, control flows to STEP 1414 where the number of processor service units consumed on the local system, LS, at the current importance, IMP, is added to the number of local processor service units allowed, LSA.

If, however, the total of processor service units consumed at the current importance is greater than the processor service units that remain to be allocated, control flows to STEP 1416 where a fraction of the remaining processor service units allowed is allocated to the local system. The raction of the remaining processor service units allocated to the local system is the number of processor service units consumed at the current importance on the local system divided by the total processor service units consumed at the current importance on the local system, plus all remote systems.

In either case control next flows to STEP 1418 where the total number of processor service units consumed on the local system plus all remote systems, TS(IMP), is subtracted from the number of processor service units remaining to be allocated, RSA. Next, a check is made to determine whether there is another importance to process, INQUIRY 1420. If yes, control flows to STEP 1422 where the current importance variable, IMP, is set to the next lower importance. Thereafter, control flows back to STEP 1410 to check whether there are more processor service units to be apportioned, as described previously.

If, however, it is determined that all the importance values have been processed, INQUIRY 1420, a check is made to determine whether the resource group was consuming less than its maximum allowed processor service units, INQUIRY 1424. If the resource group was not consuming less than its allowed maximum processor service units, control flows to STEP 1430 to calculate the cap slices for the resource group, as described below.

On the other hand, if the resource group was consuming less than its maximum processor service units, a check is made to determine whether the local system has any work at the highest importance of any work in the resource group on any system. INQUIRY 1426. The additional processor service units are apportioned to the systems that have work at the highest of the importance of the work in the resource group. If the local system does not have any work at the highest importance for work in the resource group, control flows to STEP 1430 to calculate the cap slices for the resource group, as described below.

If, on the other hand, the local system does have work at the highest importance for work in the resource group, a fraction of the remaining processor service units that may be allocated is apportioned to work on the local system, STEP 1428. The fraction apportioned to work on the local system is 1 divided by the number of systems that have work at the highest importance.

At STEP 1430, the number of processor service units allowed (i.e., maximum 134) is converted to a number of cap slices using the following steps:

1. Calculate the number of non-cap slices allowed as follows:
   Non-Cap-Slices=LSA*(TSLOW-CSLOW)/LSEROW
   Where:
   LSA—local processor service units allowed (i.e., the maximum for this system);
   TSLOW—total number of slices over window (e.g., 6*64=384, a constant);
   CSLOW—number of capped slices over a cap slice window, described below; and
   LSEROW—local processor service units consumed over a service window, described below.

Cap slice window is, for example, a 6 pane window of, for instance, 10 seconds each.

Each window pane contains the number of capped slices for that pane. Service window is also, for example, a 6 pane window, in which each pane contains the service measured over 10 seconds. Cap slice window and service window are indexed by a capping index starting at 1, incrementing by 1 and returning back to 1 after reaching 6. Cap slice window, service window and capping index are a part of processor use data 138 (however, they are not shown in FIG. 5).

2. If non-cap-slices calculates to 0, set it to 1. Do not cap 100% of the time.
3. Set cap slices equal to total slices (64) minus non-cap slices.
4. If the increase in cap slices is more than half the total number of slices, increase the number of cap slices by half the total number of slices.
5. Store the number of cap slices in the resource group table entry 140. The number of cap slices is stored in the cap slice array element indexed by the current window pane index.

Subsequent to converting the number of processor service units allowed to cap slices, flow returns to STEP 1410.

In addition to determining the number of cap slices to be capped, the cap slices for each resource group are spread relatively evenly over the cap slice pattern for the cap bit manipulator to interrogate. The resource group having the largest number of capped slices is assigned specific slices first, then the resource group needing the next largest number of cap slices, and then the next, until all resource groups having capped slices have been processed. On a system-wide basis, the same number of resource groups ±1 group are capped during each of the 64 slices in the cap slice pattern by keeping a count of the number of resource groups that are to be capped during each slice as specific slices are assigned to specific resource groups. This count is tested to determine whether the group should be assigned a specific slice. No slice is assigned to two resource groups until all 64 slices have been assigned once. No slice is assigned to three groups until all 64 slices have been assigned twice, and so on.

One embodiment for spreading the cap slices is described in detail with reference to FIG. 15. Initially, system data, cap slice count array (SCA), is initialized by setting the array elements to zero, STEP 1500. The slice count array is an array of counts. Each entry contains the number of groups that are capped during that slice. There are 64 entries in the cap slice count array. Each entry represents ¹⁄₆₄th of the time.

Thereafter, the resource group with the largest number of cap slices that has not already been processed is selected, STEP 1502. If there are no more resource groups to process, control flows to exit, STEP 1504. If there is another resource group to process, control flows to STEP 1506.

At STEP 1506, resource group data is initialized. In particular, a slice increment (SI), a slice count criteria (SCC), and a slice count array index (SCAI) are initialized, as follows: (SI-1) is the number of slices that can be skipped between each cap slice for the resource group, such that the resource group's cap slices are spread relatively evenly over the 64 possible cap slices. SI is set to 64 divided by the group's number of cap slices. SCC is set to the maximum value in the slice count array. If all the counts in the slice count array have the same value, 1 is added to SCC. The SCAI is set to 1 to start at the first slice in the cap slice pattern.

Next, the count in the SCA(SCAI) cell is checked against the criteria (SCC) for this group, INQUIRY 1508. If the slice has been assigned to SCC number of groups or has already been assigned to this group, control flows to STEP 1510, where 1 is added to SCAI. When SCAI is incremented to 65, it is reset back to 1 (that is, SCAI is modulo 64). If all the counts in the slice count array have the same value, 1 is added to SCC. Control then flows back to STEP 1508.

If the slice has been assigned to less than SCC number of resource groups and has not been assigned to the current group being processed, control flows to STEP 1512, where the slice is assigned to the group and 1 is added to the use count for the slice in the SCA. The slice is assigned to the resource group by setting the bit corresponding to SCAI in the resource group's cap slice pattern 140. Control then flows to INQUIRY 1514.

At INQUIRY 1514, a check is made to determine whether another slice is to be assigned to the current resource group. If specific slices have been assigned for all the group's cap slices, control flows back to STEP 1502 to check for another resource group. If, however, the group needs another specific slice assigned, control flows to STEP 1516.

At STEP 1516, SI is added to SCAI to set the next specific slice to check. If SCAI is greater than 64, 64 is subtracted from SCAI. If all the counts in the SCA have the same value, 1 is added to SCC. Then control flows back to STEP 1508. Thereafter, the spreading of the cap slices is complete.

Returning to FIG. 12, in addition to performing the adjustments, controller 158 also sends system data once every ten seconds (as one example), STEP 1206. For example, it sends the highest service rate calculated for this system (e.g., FIG. 13) to the system data table, as well as the service available at each importance and the unused. It also sends the CPU speed to the system data table.

Described above is a processor resource management capability that provides a selected amount of resources to real-time servers, while also ensuring a selected amount of resources are reserved for processing other types of applications and additional work on the system. The management capability of the present invention selects from the multisystem environment the system that can service the request and that displaces the lowest priority work.

The computer system described above is only one example. Other systems or environments can incorporate and/or use the present invention without departing from the spirit of the present invention.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing processor resources in a multisystem environment comprising a plurality of systems, said method comprising:

providing a plurality of application groups, said plurality of application groups including a plurality of applications of said multisystem environment and having a plurality of limits corresponding thereto on the amount of processor resource allocated to each group, wherein one group of said plurality of application groups includes one or more real-time applications;

allocating an amount of a processor resource to to one of said real-time applications of said one group, said amount not to exceed the limit chosen for said group having said one or more real-time applications, wherein a selected amount of said processor resource remains available for at least one non-real-time application of said multisystem environment; and processing said real-time application on a selected system of said plurality of systems.

2. The method of claim 1, further comprising selecting said system, wherein said selecting comprises choosing, from among at least two systems of the plurality of systems, a system where an amount of said processor resource for delivering a real-time data stream of said real-time application impacts other work processing on the selected system less than it would impact work processing on any non-selected system.

3. The method of claim 2, wherein said allocating comprises:
   determining from among the at least two systems a highest service cost, within a given period of time, for delivering a real-time data rate;
   calculating a service rate for delivering said real-time data stream, said calculating using said highest service cost; and
   determining whether said service rate falls within said limit chosen for said group having said one or more real-time applications, wherein said selecting is performed when said service rate falls within said limit.

4. The method of claim 3, wherein said determining comprises:
   determining a high service cost for the at least two systems; and
   comparing said at least two high service costs to obtain said highest service cost.

5. The method of claim 1, wherein said processing further comprises preventing said real-time application from exceeding a maximum amount of said processor resource selected for said one group having said one or more real-time applications.

6. The method of claim 1, further comprising preventing another real-time application of said one group having said one or more real-time applications from being started on said selected system, when a service rate for delivering a real-time data stream of said another real-time application does not fall within said limit of said one group.

7. A method of managing processor resources in a multisystem environment comprising a plurality of systems, said method comprising:
   allocating an amount of a processor resource to a real-time application of said multisystem environment, said amount not to exceed a limit chosen for a group of one or more real-time applications, said group including at least said real-time application, wherein a selected amount of said processor resource remains available for at least one non-real-time application of said multisystem environment;
   selecting a system to process said real-time application, wherein said selecting comprises choosing, from among at least two systems of the plurality of systems, a system where an amount of said processor resource for delivering a real-time data stream of said real-time application impacts other work processing on the selected system less than it would impact work processing on any non-selected system;
   informing at least any non-selected system about the selected system; and
   processing said real-time application on said selected system of said plurality of systems.

8. The method of claim 7, wherein said informing further comprises sending to said at least any non-selected system an indication of a service rate calculated for delivering a real-time data stream of said real-time application.

9. A method of managing processor resources in a multisystem environment comprising a plurality of systems, said method comprising:
   allocating an amount of a processor resource to a real-time application of said multisystem environment, said amount not to exceed a limit chosen for a group of one or more real-time applications, said group including at least said real-time application, wherein a selected amount of said processor resource remains available for at least one non-real-time application of said multisystem environment; and
   processing said real-time application on a selected system of said plurality of systems, said processing comprising preventing said real-time application from exceeding a maximum amount of said processor resource selected for said group having said one or more real-time applications, wherein said preventing comprises indicating one or more work units of said real-time application is non-dispatchable such that said maximum amount is not exceeded.

10. A method of managing processor resources in a multisystem environment comprising a plurality of systems, said method comprising:
    allocating an amount of a processor resource to a real-time application of said multisystem environment, said amount not to exceed a limit chosen for a group of one or more real-time applications, said group including at least said real-time application, wherein a selected amount of said processor resource remains available for at least one non-real-time application of said multisystem environment;
    indicating to one or more systems of said plurality of systems that said real-time application wishes to be processed; and
    processing said real-time application on a selected system of said plurality of systems.

11. The method of claim 10, wherein said indicating comprises:
    setting within said one or more systems a dispatch priority chosen for said real-time application; and
    specifying within said one or more systems that said dispatch priority is not to be adjusted.

12. A method of managing processor resources in a multisystem environment comprising a plurality of systems, said method comprising:
    allocating an amount of a processor resource to a real-time application of said multisystem environment, said amount not to exceed a limit chosen for a group of one or more real-time applications, said group including at least said real-time application, wherein a selected amount of said processor resource remains available for at least one non-real-time application of said multisystem environment;
    making available said limit to said plurality of systems; and
    processing said real-time application on a selected system of said plurality of systems.

13. An article of manufacture comprising:
    a computer useable medium having computer readable program code means embodied therein for causing the managing of processor resources in a multisystem environment comprising a plurality of systems, the computer readable program code means in said article of manufacture comprising:
    computer readable program code means for causing a computer to effect providing a plurality of application groups, said plurality of application groups including a plurality of applications of said multisystem environment and having a plurality of limits corresponding thereto on the amount of processor resource allocated to each group, wherein one group of said plurality of application groups includes one or more real-time applications;

computer readable program code means for causing a computer to effect allocating an amount of a processor resource to one of said real-time applications of said one group, said amount not to exceed the limit chosen for said group having said one or more real-time applications, wherein a selected amount of said processor resource remains available for at least one non-real-time application of said multisystem environment; and computer readable program code means for causing a computer to effect processing said real-time application on a selected system of said plurality of systems.

14. The article of manufacture of claim 13, further comprising computer readable program code means for causing a computer to effect selecting said system, wherein said computer readable program code means for causing a computer to effect selecting comprises computer readable program code means for causing a computer to effect choosing, from among at least two systems of the plurality of systems, a system where an amount of said processor resource for delivering a real-time data stream of said real-time application impacts other work processing on the selected system less than it would impact work processing on any non-selected system.

15. The article of manufacture of claim 14, wherein said computer readable program code means for causing a computer to effect allocating comprises:

computer readable program code means for causing a computer to effect determining from among the at least two systems a highest service cost, within a given period of time, for delivering a real-time data rate;

computer readable program code means for causing a computer to effect calculating a service rate for delivering said real-time data stream, said calculating using said highest service cost; and computer readable program code means for causing a computer to effect determining whether said service rate falls within said limit chosen for said group having said one or more real-time applications, wherein said selecting is performed when said service rate falls within said limit.

16. The article of manufacture of claim 15, wherein said computer readable program code means for causing a computer to effect determining comprises:

computer readable program code means for causing a computer to effect determining a high service cost for the at least two systems; and computer readable program code means for causing a computer to effect comparing said at least two high service costs to obtain said highest service cost.

17. The article of manufacture of claim 13, wherein said computer readable program code means for causing a computer to effect processing further comprises computer readable program code means for causing a computer to effect preventing said real-time application from exceeding a maximum amount of said processor resource selected for said one group having said one or more real-time applications.

18. The article of manufacture of claim 12, further comprising computer readable program code means for causing a computer to effect preventing another real-time application of said one group having said one or more real-time applications from being started on said selected system, when a service rate for delivering a real-time data stream of said another real-time application does not fall within said limit of said one group.

19. An article of manufacture comprising:

a computer useable medium having computer readable program code means embodied therein for causing the managing of processor resources in a multisystem environment comprising a plurality of systems, the computer readable program code means in said article of manufacture comprising:

computer readable program code means for causing a computer to effect allocating an amount of a processor resource to a real-time application of said multisystem environment, said amount not to exceed a limit chosen for a group of one or more real-time applications, said group including at least said real-time application, wherein a selected amount of said processor resource remains available for at least one non-real-time application of said multisystem environment;

computer readable program code means for causing a computer to effect selecting a system to process said real-time application, wherein said computer readable program code means for causing a computer to effect selecting comprises computer readable program code means for causing a computer to effect choosing, from among at least two systems of the plurality of systems, a system where an amount of said processor resource for delivering a real-time data stream of said real-time application impacts other work processing on the selected system less than it would impact work processing on any non-selected system;

computer readable program code means for causing a computer to effect informing at least any non-selected system about the selected system; and computer readable program code means for causing a computer to effect processing said real-time application on said selected system of said plurality of systems.

20. The article of manufacture of claim 19, wherein said computer readable program code means for causing a computer to effect informing further comprises computer readable program code means for causing a computer to effect sending to said at least any non-selected system an indication of a service rate calculated for delivering a real-time data stream of said real-time application.

21. An article of manufacture comprising:

a computer useable medium having computer readable program code means embodied therein for causing the managing of processor resources in a multisystem environment comprising a plurality of systems, the computer readable program code means in said article of manufacture comprising:

computer readable program code means for causing a computer to effect allocating an amount of a processor resource to a real-time application of said multisystem environment, said amount not to exceed a limit chosen for a group of one or more real-time applications, said group including at least said real-time application, wherein a selected amount of said processor resource remains available for at least one non-real-time application of said multisystem environment; and computer readable program code means for causing a computer to effect processing said real-time application on a selected system of said plurality of systems, wherein said computer readable program code means for causing a computer to effect processing comprises computer readable program code means for causing a computer to effect preventing said real-time application from exceeding a maximum amount of said processor resource selected for said group having said one or more real-time applications, and wherein said computer readable program code means for causing a computer to effect preventing comprises computer readable program code means for causing a computer to effect indicating one or more work units of said real-time application is non-dispatchable such that said maximum amount is not exceeded.

22. An article of manufacture comprising:

a computer useable medium having computer readable program code means embodied therein for causing the managing of processor resources in a multisystem environment comprising a plurality of systems, the computer readable program code means in said article of manufacture comprising:

computer readable program code means for causing a computer to effect allocating an amount of a processor resource to a real-time application of said multisystem environment, said amount not to exceed a limit chosen for a group of one or more real-time applications, said group including at least said real-time application, wherein a selected amount of said processor resource remains available for at least one non-real-time application of said multisystem environment;

computer readable program code means for causing a computer to effect indicating to one or more systems of said plurality of systems that said real-time application wishes to be processed; and computer readable program code means for causing a computer to effect processing said real-time application on a selected system of said plurality of systems.

23. The article of manufacture of claim 22, wherein said computer readable program code means for causing a computer to effect indicating comprises:

computer readable program code means for causing a computer to effect setting within said one or more systems a dispatch priority chosen for said real-time application; and computer readable program code means for causing a computer to effect specifying within said one or more systems that said dispatch priority is not to be adjusted.

24. An article of manufacture comprising:

a computer useable medium having computer readable program code means embodied therein for causing the managing of processor resources in a multisystem environment comprising a plurality of systems, the computer readable program code means in said article of manufacture comprising:

computer readable program code means for causing a computer to effect allocating an amount of a processor resource to a real-time application of said multisystem environment, said amount not to exceed a limit chosen for a group of one or more real-time applications, said croup including at least said real-time application, wherein a selected amount of said processor resource remains available for at least one non-real-time application of said multisystem environment;

computer readable program code means for causing a computer to effect making available said limit to said plurality of systems; and computer readable program code means for causing a computer to effect processing said real-time application on a selected system of said plurality of systems.

25. A method of managing processor resources in a multisystem environment comprising a plurality of systems, said method comprising:

providing a plurality of application groups, said plurality of application groups including a plurality of applications of said multisystem environment and having a plurality of limits corresponding thereto on the amount of processor resource alllocated to each group, wherein one group of said plurality of application groups includes a real-time application;

determining whether a service rate for delivering a real-time data stream of said real-time application falls within the limit chosen for said one group having said real-time application; and preventing said real-time application from starting on a system of said plurality of systems, when said service rate does not fall within said limit.

26. An article of manufacture comprising:

a computer useable medium having computer readable program code means embodied therein for causing the managing of processor resources in a multisystem environment comprising a plurality of systems, the computer readable program code means in said article of manufacture comprising:

computer readable program code means for causing a computer to effect providing a plurality of application groups, said plurality of application groups including a plurality of applications of said multisystem environment and having a plurality of limits corresponding thereto on the amount of processor resource allocated to each group, wherein one group of said plurality of application groups includes a real-time application;

computer readable program code means for causing a computer to effect determining whether a service rate for delivering a real-time data stream of said real-time application falls within the limit chosen for said one group having said real-time application; and computer readable program code means for causing a computer to effect preventing said real-time application from starting on a system of said plurality of systems when said service rate does not fall within said limit.

* * * * *

UNITED STATES PATENT AND TRADEMARK OFFICE
CERTIFICATE OF CORRECTION

PATENT NO. : 5,925,102
DATED : July 20, 1999
INVENTOR(S) : Eilert et al.

It is certified that error appears in the above-identified patent and that said Letters Patent is hereby corrected as shown below:

ON THE TITLE PAGE:

Item [57] ABSTRACT: Line 5, delete "proseccing" and replace with --processing--.

IN THE CLAIMS:

Claim 18, line 64, delete "12" and replace with --13--.

Signed and Sealed this
Fourth Day of January, 2000

Attest:

Attesting Officer

*Acting Commissioner of Patents and Trademarks*